UNITED STATES PATENT OFFICE.

WALTER JAMES REYNOLDS, OF AUSTIN, TEXAS.

OIL SUBSTITUTE.

SPECIFICATION forming part of Letters Patent No. 582,686, dated May 18, 1897.

Application filed January 31, 1896. Serial No. 577,643. (No specimens.)

*To all whom it may concern:*

Be it known that I, WALTER JAMES REYNOLDS, a citizen of the United States, residing in the city of Austin, in the county of Travis and State of Texas, have invented a new, useful, and valuable Improvement in Oil Substitutes; and I hereby declare the following to be a full, clear, and exact description thereof.

In making my oil substitute I proceed according to any of the following formulæ:

Formula No. 1: Take four ounces of frozen glue or furniture-glue and dissolve same in four quarts of boiling-hot water, add one-fourth ounce soda-ash, then add one-eighth ounce of salicylic acid, and boil all together. This makes one gallon of oil substitute.

Formula No. 2: Take three ounces of frozen glue, dissolve in three and one-half quarts boiling-hot water, take two ounces rosin, add one pint of water, add one-fourth ounce soda-ash, (this dissolves rosin,) add one-tenth ounce salicylic acid, and boil all together. This makes one gallon oil substitute.

Formula No. 3: Take three ounces of frozen glue, dissolve in three and one-half quarts of boiling-hot water, add one and three-fourth ounces of rosin to one pint of water, add one-fourth ounce of soda-ash, (this dissolves rosin,) add two ounces of litharge, dissolve same in one-tenth ounce acetic acid, add one-tenth ounce of salicylic acid, and boil all together. This makes one gallon of oil substitute.

To this oil substitute may be added suitable pigments, such as minerals, ochre, or painters' earth, in such a way that it forms a hard surface that will not crack, peel, or wash off, as it would otherwise do unless treated with oil or other higher-priced materials. It can be applied either hot or cold.

The object of this invention is to make a compound to take the place of paint-oil, cheapness being the great object.

It is obvious that the quantities of frozen glue, rosin, soda-ash, litharge, and acids making up formulæ may be changed with more or less success. An oil may be added in different quantities, as this substitute is so made that a perfect emulsion is made when any quantity of oil is added.

Having thus described my invention and discovery, I claim as new and desire to secure by Letters Patent—

1. An oil substitute consisting of frozen glue, water, soda-ash, and salicylic acid, in substantially the portions specified.

2. An oil substitute consisting of frozen glue, water, soda-ash, salicylic acid and rosin, in substantially the portions specified.

3. An oil substitute consisting of frozen glue, water, soda-ash, salicylic acid, rosin, acetic acid and litharge, substantially in the portions specified.

WALTER JAMES REYNOLDS.

Witnesses:
W. P. LITTLEFIELD,
A. MCCURDY.